United States Patent
Guarnieri et al.

(10) Patent No.: US 8,537,425 B2
(45) Date of Patent: Sep. 17, 2013

(54) METHOD FOR OPTIMIZING THE SEARCH FOR TRAPPING REGIONS

(75) Inventors: Stuart Guarnieri, Laramie, WY (US); Markus Maresch, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 317 days.

(21) Appl. No.: 12/286,642

(22) Filed: Sep. 30, 2008

(65) Prior Publication Data

US 2010/0079817 A1 Apr. 1, 2010

(51) Int. Cl.
*H04N 1/40* (2006.01)

(52) U.S. Cl.
USPC .......... 358/3.24; 358/1.9; 358/3.26; 358/540

(58) Field of Classification Search
None
See application file for complete search history.

(56) References Cited

U.S. PATENT DOCUMENTS

| | | | |
|---|---|---|---|
| 4,583,116 A | 4/1986 | Hennig et al. | |
| 4,700,399 A | 10/1987 | Yoshida | |
| 4,931,861 A | 6/1990 | Taniguchi | |
| 5,131,058 A | 7/1992 | Ting et al. | |
| 5,204,918 A | 4/1993 | Hirosawa | |
| 5,241,396 A | 8/1993 | Harrington | |
| 5,295,236 A | 3/1994 | Bjorge et al. | |
| 5,313,570 A | 5/1994 | Dermer et al. | |
| 5,386,223 A | 1/1995 | Saitoh et al. | |
| 5,386,483 A | 1/1995 | Shibazaki | |
| 5,402,530 A | 3/1995 | Boenke et al. | |
| 5,440,652 A | 8/1995 | Ting | |
| 5,513,300 A | 4/1996 | Shibazaki | |
| 5,542,052 A | 7/1996 | Deutsch et al. | |
| 5,613,046 A | 3/1997 | Dermer | |
| 5,615,314 A | 3/1997 | Schoenzeit et al. | |
| 5,666,543 A * | 9/1997 | Gartland ........................ 715/205 | |
| 5,668,931 A | 9/1997 | Dermer | |
| 6,341,020 B1 | 1/2002 | Rumph et al. | |
| 6,345,117 B2 * | 2/2002 | Klassen ........................ 382/167 | |
| 6,366,361 B1 | 4/2002 | Dermer et al. | |
| 6,377,711 B1 | 4/2002 | Morgana | |
| 6,378,983 B1 | 4/2002 | Ito et al. | |

(Continued)

FOREIGN PATENT DOCUMENTS

| | | |
|---|---|---|
| EP | 0 901 096 B1 | 3/1999 |
| EP | 0 996 281 A2 | 4/2000 |

(Continued)

OTHER PUBLICATIONS

U.S. Appl. No. 12/242,687, filed Sep. 30, 2008.

(Continued)

*Primary Examiner* — Twyler Haskins
*Assistant Examiner* — Christopher D Wait
(74) *Attorney, Agent, or Firm* — Finnegan, Henderson, Farabow, Garrett & Dunner, L.L.P.

(57) ABSTRACT

Methods disclosed permit the identification of frame buffer pixels for trapping. In some embodiments, flags associated with pixels in the frame buffer may be used to provide an indication of pixels for trapping. A first bit in a flag associated with a pixel may be set when the pixel is painted. In some embodiments, the method discloses a process for setting the value of a second bit in the flag to determine if the pixel associated with the flag lies on an object boundary. The pixel is identified as a candidate for trapping based on the value of the at least one flag.

20 Claims, 12 Drawing Sheets

(56) References Cited

U.S. PATENT DOCUMENTS

| | | |
|---|---|---|
| 6,549,303 B1 | 4/2003 | Trask |
| 6,738,159 B2 | 5/2004 | Harrington |
| 6,992,798 B2 | 1/2006 | Geurts et al. |
| 7,123,381 B2 | 10/2006 | Klassen |
| 7,139,098 B2 | 11/2006 | Klassen |
| 7,164,498 B2 | 1/2007 | Van Bael |
| 7,259,784 B2 | 8/2007 | Cutler |
| 7,263,218 B2 | 8/2007 | Altenhof-Long et al. |
| 7,362,467 B1 | 4/2008 | Tsukimura |
| 7,411,707 B2 | 8/2008 | Ikeda |
| 7,508,550 B2 | 3/2009 | Kameyama |
| 7,639,399 B2 | 12/2009 | Ikeda |
| 7,679,619 B2 | 3/2010 | Ooga et al. |
| 7,724,393 B2 | 5/2010 | Segawa et al. |
| 7,817,305 B2 | 10/2010 | Joergens et al. |
| 7,826,095 B2 | 11/2010 | Wang et al. |
| 7,847,973 B2 | 12/2010 | Schoner |
| 2001/0033686 A1 | 10/2001 | Klassen |
| 2003/0044065 A1 | 3/2003 | Harrington |
| 2003/0063301 A1 | 4/2003 | Klassen |
| 2003/0090689 A1 | 5/2003 | Klassen |
| 2004/0017595 A1 | 1/2004 | Ikeda |
| 2004/0108384 A1 | 6/2004 | Wang et al. |
| 2004/0160632 A1 | 8/2004 | Kato et al. |
| 2005/0099642 A1* | 5/2005 | Segawa et al. ............ 358/1.9 |
| 2006/0033960 A1 | 2/2006 | Allen |
| 2006/0153441 A1 | 7/2006 | Li |
| 2008/0007752 A1 | 1/2008 | Gandhi et al. |
| 2008/0094515 A1 | 4/2008 | Gutta et al. |
| 2010/0079815 A1 | 4/2010 | Obrecht et al. |
| 2010/0149201 A1 | 6/2010 | Guarnieri |
| 2012/0200896 A1 | 8/2012 | Guarnieri et al. |

FOREIGN PATENT DOCUMENTS

| | | |
|---|---|---|
| EP | 0 996 282 B1 | 4/2000 |
| EP | 0 998 131 A2 | 5/2000 |
| EP | 1 166 548 B1 | 1/2002 |
| JP | 2006-005481 A | 1/2006 |
| JP | 2007-144929 A | 6/2007 |
| JP | 2007-221226 A | 8/2007 |
| JP | 2007-221227 A | 8/2007 |
| JP | 2008-072670 A | 3/2008 |
| WO | WO 00/57632 | 9/2000 |
| WO | WO 2008/062041 A1 | 5/2008 |

OTHER PUBLICATIONS

Office Action dated May 25, 2011, in related U.S. Appl. No. 12/242,687, filed Sep. 30, 2008, Douglas Obrecht.
U.S. Appl. No. 12/336,261, filed Dec. 16, 2008.
Office Action dated Nov. 1, 2011, in related U.S. Appl. No. 12/242,687, filed Sep. 30, 2008, Douglas Obrecht.
Office Action dated Jan. 6, 2012, in related U.S. Appl. No. 12/336,261, filed Dec. 16, 2008, Stuart Guarnieri.
U.S. Appl. No. 13/369,521, filed Feb. 9, 2012.
Office Action dated Feb. 7, 2012, in related U.S. Appl. No. 12/242,687, filed Sep. 30, 2008, Douglas Obrecht.
Notice of Allowance dated Oct. 16, 2012, in related U.S. Appl. No. 12/242,687, filed Sep. 30, 2008, Douglas Obrecht.
Office Action dated Jun. 11, 2012, in related U.S. Appl. No. 12/336,261, filed Dec. 16, 2008, Stuart Guarnieri.
Office Action dated Oct. 26, 2012, in related U.S. Appl. No. 12/336,261, filed Dec. 16, 2008, Stuart Guarnieri.
Office Action dated Nov. 26, 2012, in related U.S. Appl. No. 12/336,261, filed Dec. 16, 2008, Stuart Guarnieri.

* cited by examiner

METHOD FOR OPTIMIZING THE SEARCH FOR TRAPPING REGIONS

BACKGROUND

1. Field of the Invention

The present invention relates to the field of printing and in particular, to a method for minimizing the search for trapping regions in print devices.

2. Description of Related Art

Pixels generated by a color printer typically consist of colors from multiple color planes. For example, in a color printer that uses cyan, magenta, yellow, and black ("CMYK"), a single pixel can consist of color from one or more of the four color planes. A wide range of colors may be produced by a printer when colors from constituent color planes are combined with differing intensities. The color components that make up a pixel are ideally printed on top of, or very close to one another. However, because of misregistration caused by print engine misalignment, paper stretching, and other mechanical imprecisions, the constituent color planes that make up a single pixel may not overlap adequately resulting in unsightly small white gaps between different-colored regions on the page, or in colored edges to black regions. To redress misregistration it is common to use a technique called trapping, which expands or contracts coloring regions slightly in order to eliminate white gaps and/or colored edges between graphical objects. Trapping introduces areas of color into color separations and masks the visible effects of misregistration.

Trapping is often implemented using raster-based trapping, which involves the computationally expensive step of finding object boundaries using data in the frame buffer that potentially spans multiple color planes. In large part, the computational cost arises because trapping may be performed on a pixel-by-pixel basis. For example, raster-based trapping performed even for a relatively small 3×3 pixel area with width=height=1 using a CMYK color model, involves checking and comparing no less than 36 (9 pixels across 4 planes) memory locations. Because the computational cost is associated to a large degree with a brute force pixel-by-pixel approach, significant reductions in computational cost may be achieved by reducing the number of pixels processed as potential trapping candidates. Thus, there is a need for systems and methods that decrease the computational cost associated with providing trapping functionality by reducing the search space for trapping regions.

SUMMARY

Consistent with embodiments presented, a method for identifying at least one frame buffer pixel as a candidate for trapping is presented. In some embodiments, a method for identifying at least one frame buffer pixel associated with at least one display list object as a candidate for trapping comprises associating at least one flag with the pixel and setting a first bit in the flag when rendering the pixel to a frame buffer. The value of a second bit in the flag is calculated by setting the second bit, if the pixel is a boundary pixel; resetting the second bit in the flag, if the display list object is opaque and if the at least one frame buffer pixel is a non-boundary pixel; and performing a logical 'OR' operation using the current value of the second bit in the flag and a logical '0', if the at least one display list object is non-opaque and the pixel is a non-boundary pixel. The pixel may be identified as a candidate for trapping based on the value of the second bit in the flag.

Embodiments also relate to software, firmware, and program instructions created, stored, accessed, or modified by processors using computer-readable media or computer-readable memory. The methods described may be performed on a computer and/or a printing device.

These and other embodiments are further explained below with respect to the following figures.

BRIEF DESCRIPTION OF THE DRAWINGS

FIGS. 3A, 3B, and 3C show a pixel "0" and pixels that neighbor pixel "0" for three different exemplary rectangular trapping regions.

DETAILED DESCRIPTION

In accordance with embodiments reflecting various features of the present invention, systems and methods for implementing trapping using a second or intermediate form of printable data generated from a first printable data are presented. In some embodiments, the first printable data may take the form of a PDL description of a document and the intermediate printable data may take the form of a display list of objects generated from the PDL description.

Figure 1:
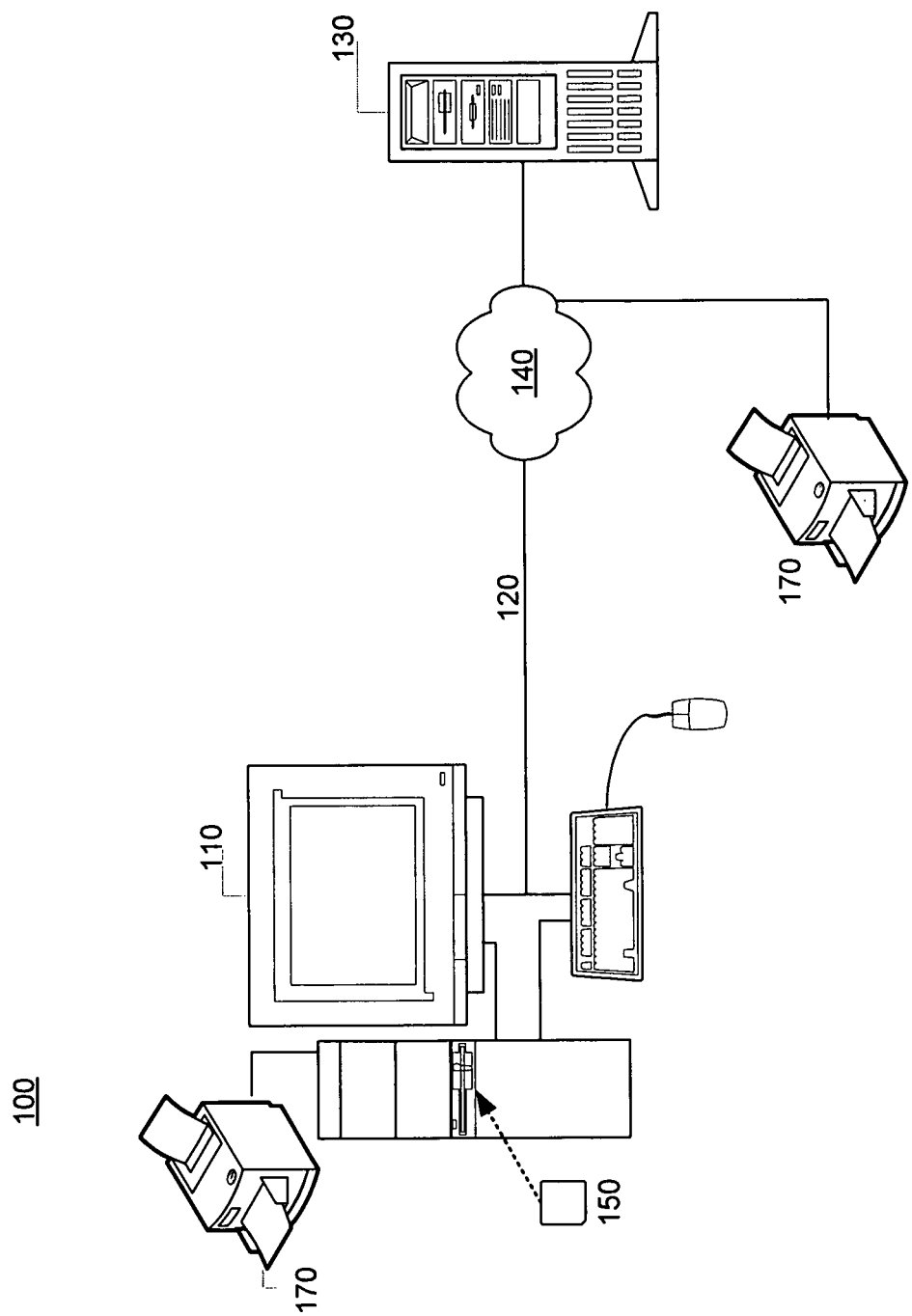
FIG. 1 shows a block diagram illustrating components in a system for printing documents consistent with some embodiments of the present invention.

FIG. 1 shows a block diagram illustrating components in an exemplary system for printing documents. An application for implementing trapping may be deployed on a network of computers and printing devices, as shown in FIG. 1, that are connected through communication links that allow information to be exchanged using conventional communication protocols and/or data port interfaces.

As shown in FIG. 1, exemplary system 100 includes computers including a computing device 110 and a server 130. Further, computing device 110 and server 130 may communicate over a connection 120, which may pass through network 140. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Document processing software running on computing device 110 and/or server 130 may allow users to view, edit, process, and store documents conveniently. Pages to print in a document may be described in a page description language ("PDL"). PDL's may include PostScript™, Adobe™ PDF, HP™ PCL, Microsoft™ XPS, and variants thereof. A PDL description of a document provides a high-level description of each page in a document. This PDL description is often translated to a series of lower-level printer-specific commands when the document is being printed.

The translation process from PDL to lower-level printer-specific commands may be complex and depend on the features and capabilities offered by exemplary printer 170. For example, printer 170 may process its data in stages. In a first stage, printer 170 may parse PDL commands and break down high-level instructions into a set of lower level instructions called primitives. These primitives may be fed to a subsequent stage in exemplary printer 170, which may use them to determine where to place marks on a page. In some instances, each primitive may be processed as it is generated. In other systems, a large set of primitives may be generated, stored, and then processed. For example, the primitives needed to describe a single page may be generated, stored in a list, and then processed. A set of stored primitives is termed an intermediate list or a display list.

In general, printer 170 may be any device that can be configured to produce physical documents from electronic data including, but not limited to, electro-photographic printers, such as laser printers and LED printers, ink-jet printers, thermal printers, laser imagers, and offset printers. Printer 170 may have an image transmitting/receiving function, an image scanning function, and/or a copying function, as installed in facsimile machines and digital copiers. Exemplary printer 170 may also be capable of directly printing documents received from computing device 110 or server 130 over connection 120. In some embodiments such an arrangement may allow for the direct printing of documents, with (or without) additional processing by computing device 110 or server 130. The processing of documents, which may contain one or more of text, graphics, and images, can be distributed. Thus, computing device 110, server 130, and/or the printer may perform portions of document print processing such as half-toning, color matching, and/or other manipulation processes before a document is physically printed by printer 170.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/or any other removable media drives. Portions of applications may reside on removable media and be read by computing device 110 using removable media drive 150 prior to being acted upon by system 100.

Connection 120 couples computing device 110, server 130, and printer 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet, USB™, SCSI, FIREWIRE™, and/or coaxial cable ports for transmission of data through the appropriate connection.

Network 140 could include a Local Area Network (LAN), a Wide Area Network (WAN), or the Internet. In some embodiments, information sent over network 140 may be encrypted to ensure the security of the data being transmitted. Printer 170 may be connected to network 140 through connection 120. Exemplary printer 170 may also be connected directly to computing device 110 and/or server 130. System 100 may also include other peripheral devices (not shown). An application to implement trapping for print devices may be deployed on one or more of the exemplary computers or printers, as shown in FIG. 1. For example, computing device 110 could execute software that may be downloaded directly from server 130, and portions of the application may also be executed by exemplary printer 170.

Figure 2:
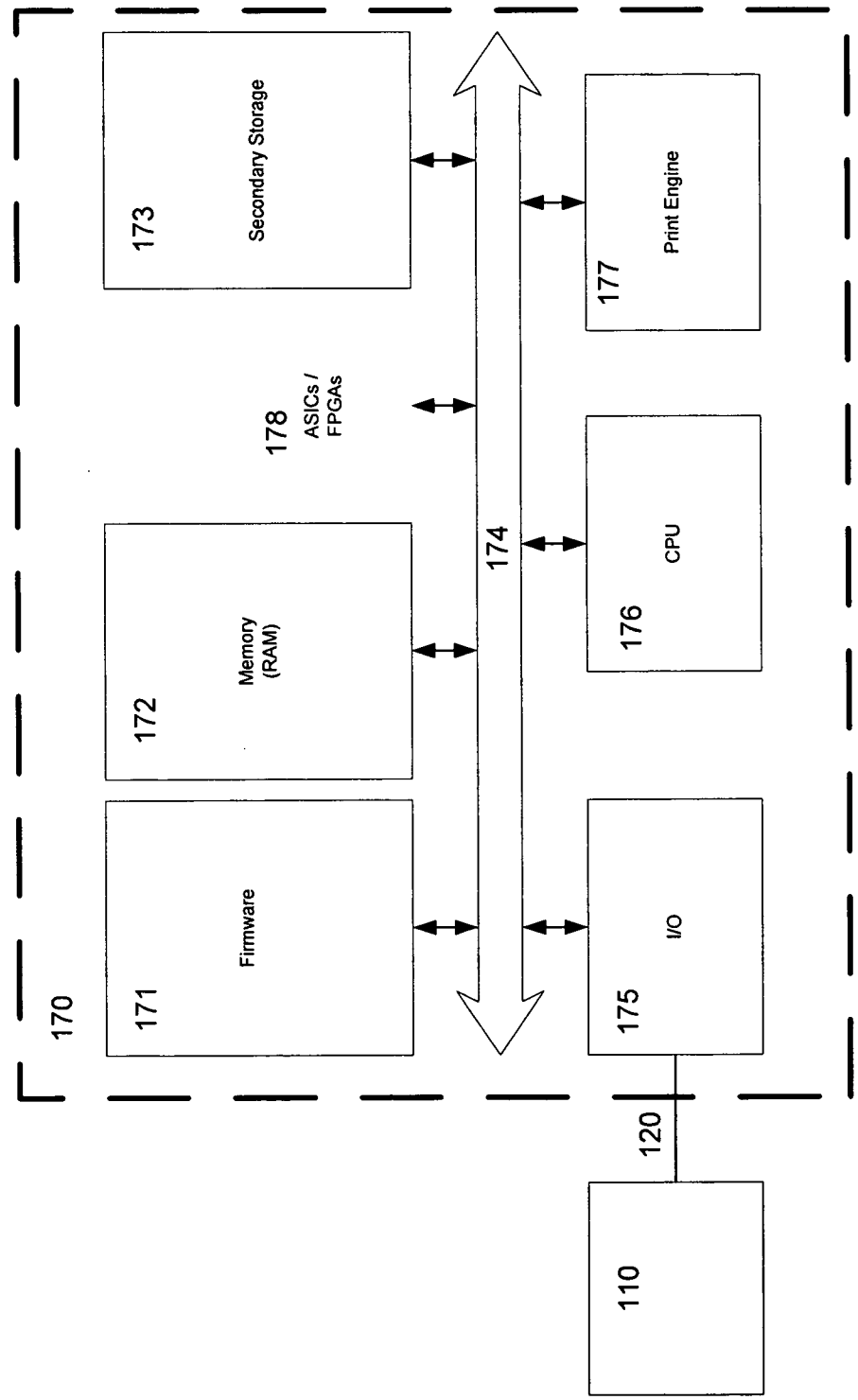
FIG. 2 shows a high level block diagram of an exemplary printer.

FIG. 2 shows a high-level block diagram of exemplary printer 170. Exemplary printer 170 may contain bus 174 that couples CPU 176, firmware 171, memory 172, input-output ports 175, print engine 177, and secondary storage device 173. Exemplary Printer 170 may also contain other Application Specific Integrated Circuits (ASICs), and/or Field Programmable Gate Arrays (FPGAs) 178 that are capable of executing portions of an application to print or process documents. Exemplary printer 170 may also be able to access secondary storage or other memory in computing device 110 using I/O ports 175 and connection 120. In some embodiments, printer 170 may also be capable of executing software including a printer operating system and other appropriate application software. Exemplary printer 170 may allow paper sizes, output trays, color selections, and print resolution, among other options, to be user-configurable.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines including routines for image processing, trapping, document processing, and other code. In some embodiments, code and data in firmware 171 may be copied to memory 172 prior to being acted upon by CPU 176. Routines in firmware 171 may include code to translate page descriptions received from computing device 110 to display lists. In some embodiments, firmware 171 may include rasterization routines to convert display commands in a display list to an appropriate rasterized bit map and store the bit map in memory 172. Firmware 171 may also include compression, trapping, and memory management routines. Data and instructions in firmware 171 may be upgradeable using one or more of computer 110, network 140, removable media coupled to printer 170, and/or secondary storage 173.

Exemplary CPU 176 may act upon instructions and data and provide control and data to ASICs/FPGAs 178 and print engine 177 to generate printed documents. ASICs/FPGAs 178 may also provide control and data to print engine 177. FPGAs/ASICs 178 may also implement one or more of translation, trapping, compression, and rasterization algorithms.

Exemplary computing device 110 may transform document data into a first printable data. In some embodiments, the first printable data may correspond to a PDL description of a document. Then, the first printable data can be sent to printer 170 for transformation into intermediate printable data. In some embodiments, the translation process from a PDL description of a document to the final printable data comprising of a series of lower-level printer-specific commands may include the generation of intermediate printable data comprising of display lists of objects. Display lists may hold one or more of text, graphics, and image data objects and one or more types of data objects in a display list may correspond to an object in a user document.

Display lists, which may aid in the generation of final printable data, may be stored in memory 172 or secondary storage 173. Exemplary secondary storage 173 may be an internal or external hard disk, memory stick, or any other memory storage device capable of being used by system 200. In some embodiments, the display list may reside and be transferred between one or more of printer 170, computing device 110, and server 130 depending on where the document processing occurs. Memory to store display lists may be a dedicated memory or form part of general purpose memory, or some combination thereof. In some embodiments, memory to hold display lists may be dynamically allocated, managed, and released as needed. Printer 170 may transform intermediate printable data into a final form of printable data and print according to this final form.

Figure 3:
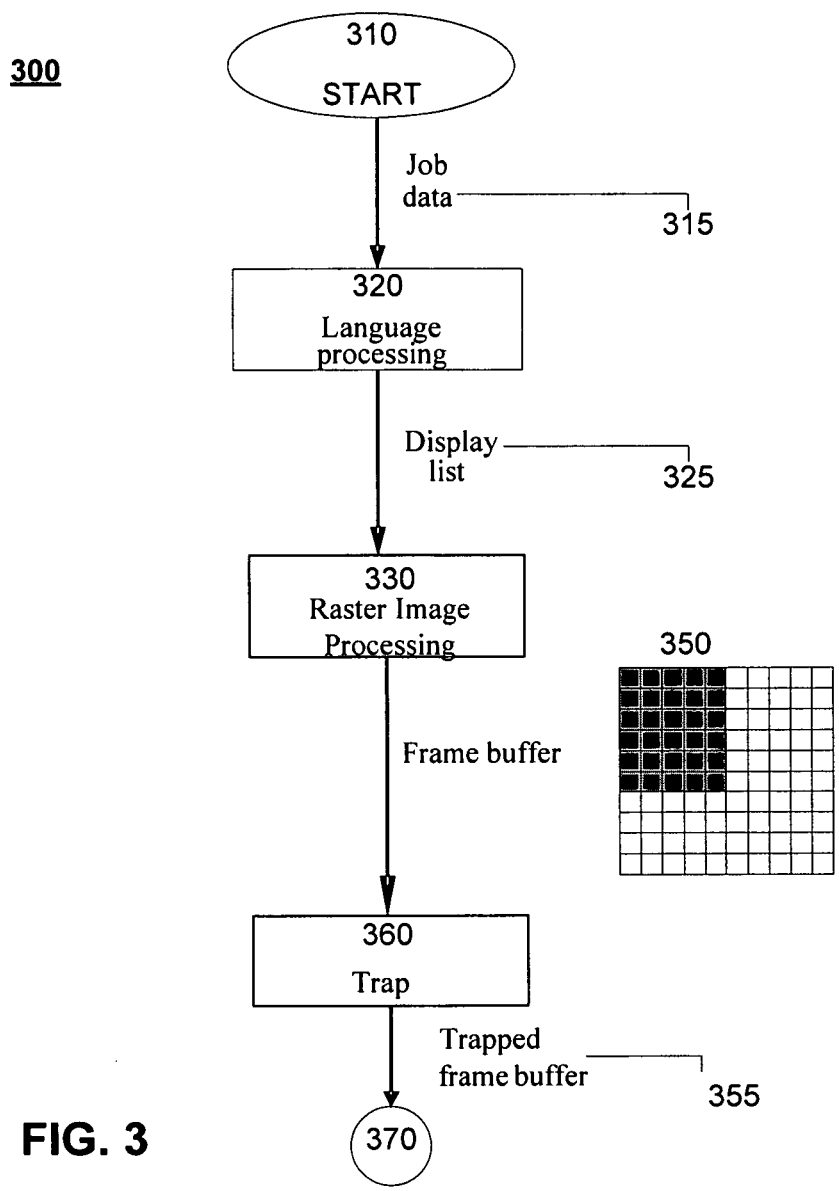
FIG. 3 shows an exemplary flowchart illustrating steps in a conventional method for performing trapping on data in the frame buffer utilized by a raster image processor.

FIG. 3 shows exemplary flowchart 300 illustrating steps in a conventional method for performing trapping on data in the frame buffer utilized by a raster image processor. The process may start in step 310 with the initiation of a print job. In step 320, print job data 315 can be subjected to language processing. In some embodiments, language processing may be performed by a language server. For example, a language server may take PDL language-level objects and transform the language level objects into data, image, text, and graphical objects and add these objects to display list 325.

Exemplary display list 325 may be an intermediate step in the processing of data prior to actual printing and may be parsed before conversion into a subsequent form. The conversion process from a display list representation to a form suitable for printing on physical media may be referred to as rasterizing the data or rasterization. Display list 325 may include such information as color, opacity, boundary information, and depth for display list objects. For example, basic rasterization may be accomplished by taking a 3-dimensional scene, typically described using polygons, and rendering the 3-dimensional scene onto a 2-dimensional surface. Polygons can be represented as collections of triangles. A triangle may be represented by 3 vertices in the 3-dimensional space. A vertex defines a point, an endpoint of an edge, or a corner of a polygon where two edges meet. Thus, basic rasterization may transform a stream of vertices into corresponding 2-dimensional points and fill in the transformed 2-dimensional triangles. Upon rasterization, the rasterized data may be stored in a frame buffer, such as exemplary frame buffer 350, which may be physically located in memory 172. Print engine 177, may process the rasterized data in frame buffer 350, and form a printable image of the page on a print medium, such as paper.

In step 330, Raster Image Processing (RIP) module may process objects in display list 325 and generate a rasterized equivalent in frame buffer 350. In some embodiments, raster image processing may be performed by printer 170. For example, raster image processing may be performed by printer 170 using one or more of CPU 176, ASICs/FPGAs 178, memory 172, and/or secondary storage 173. Raster image processing may be performed by printer 170 using some combination of software, firmware, and/or specialized hardware such as ASICs/FPGAs 178. Frame buffer 350 may hold a representation of print objects in a form suitable for printing on a print medium by print engine 177.

Data in frame buffer 350 may then be subjected to trapping in step 360. Any of several well-known trapping algorithms may be used to perform trapping. Trapped frame buffer 355 may then be subjected to any additional processing in step 370. For example, print engine 177 may render trapped frame buffer 355 on a print medium after further processing. Because conventional trapping algorithms can be computationally expensive when performed on a pixel by pixel basis, optimizing the search for trapping regions may permit reductions in computational complexity.

Figure 3A:
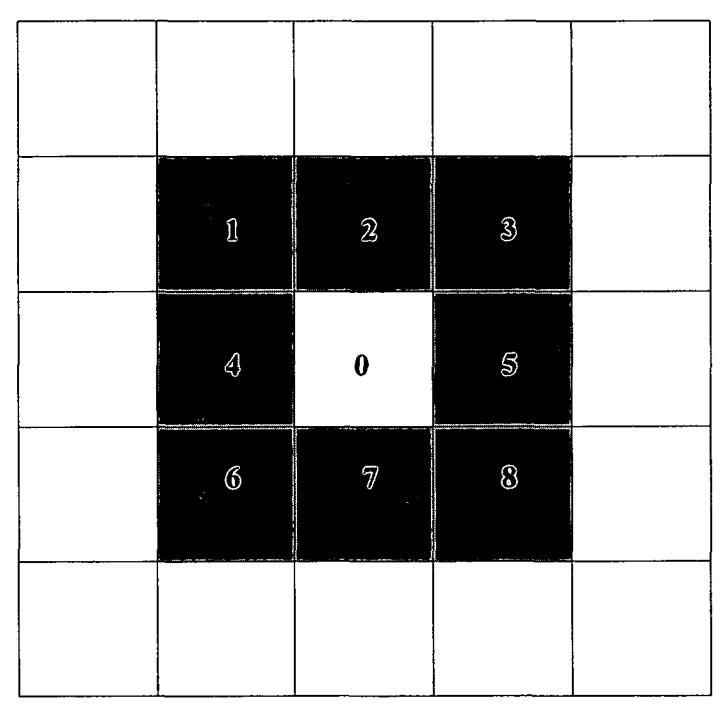
Figure 3B:
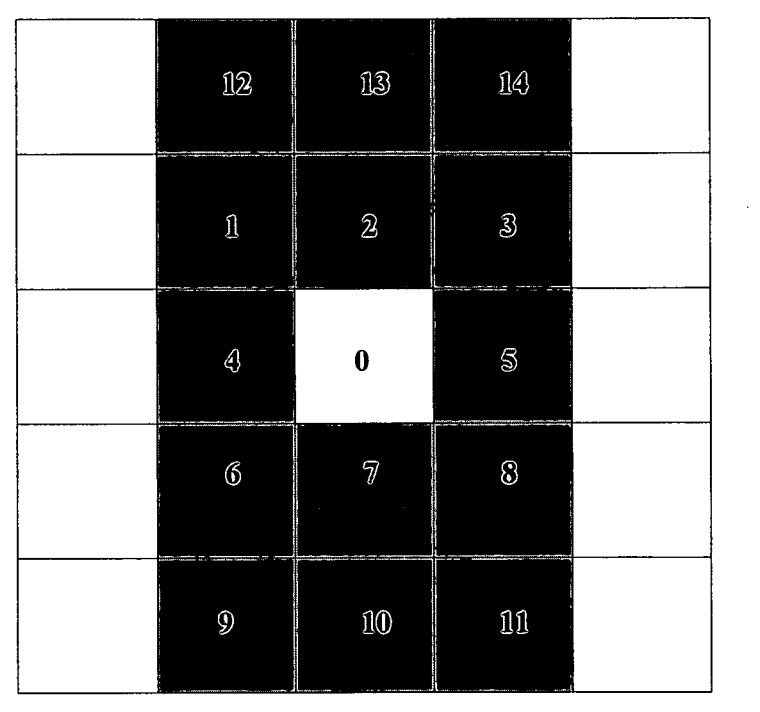
Figure 3C:
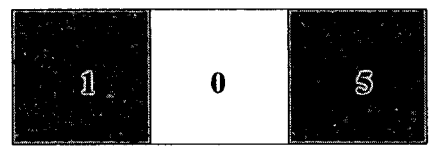

As shown in FIG. 3A, the pixel labeled "0" has eight neighbors identified by labels 1 through 8. As shown in FIG. 3A, pixels that neighbor pixel 0 lie in the exemplary trapping region indicated by the shaded rectangular portion in FIG. 3A. Similarly, as shown in FIG. 3B, the pixel labeled "0" has fourteen neighbors identified by labels 1 through 14. Pixels that neighbor pixel "0" lie in the exemplary trapping region indicated by the shaded rectangular portion in FIG. 3B. FIG. 3C shows another exemplary rectangular trapping region. As shown in FIG. 3C, pixel "0" has two neighbors given by pixels 1 and 5, respectively.

Figure 4:
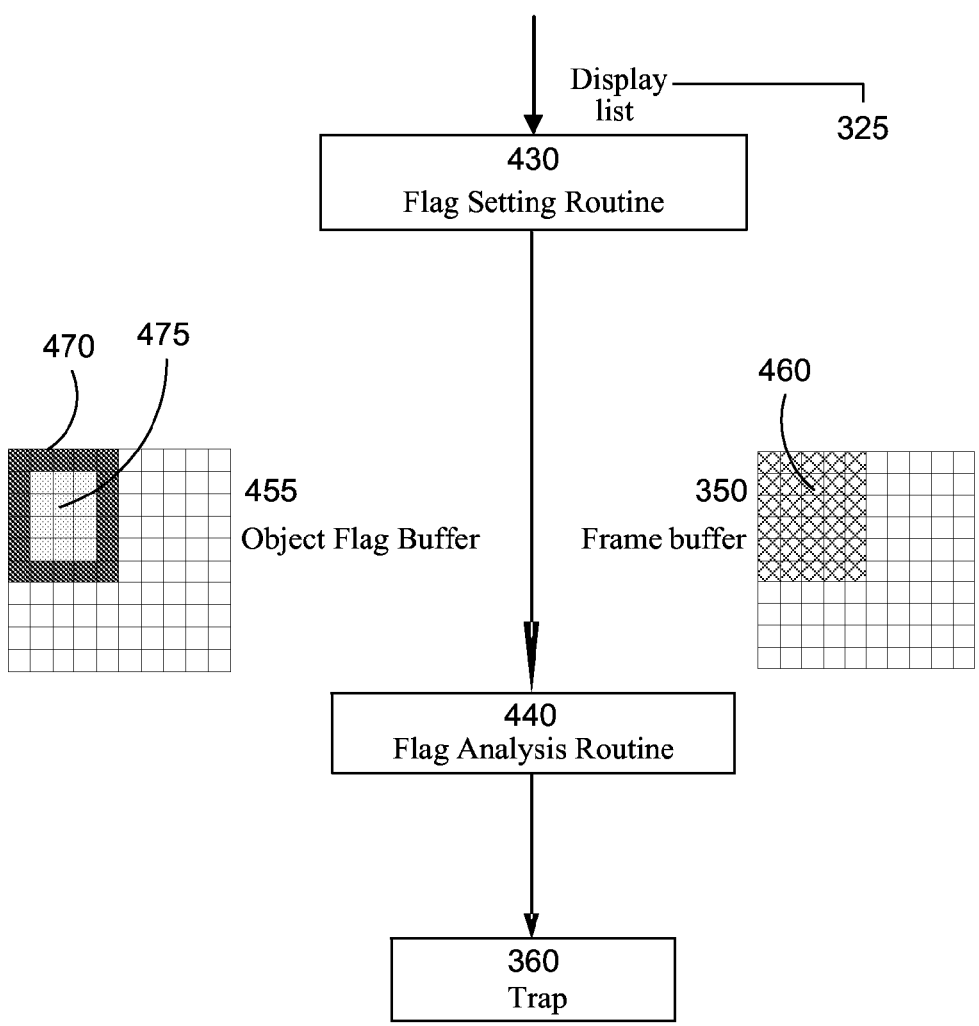
FIG. 4 shows a flowchart illustrating steps in an exemplary method for performing trapping.

FIG. 4 shows exemplary flowchart 400 illustrating steps in a method for optimizing the search for trapping regions. In some embodiments, the method shown in flowchart 400 may be performed using raster image processing module in step 330. In some embodiments, pixels associated with the boundary of an object (boundary pixels) may be identified as pixels in "non-constant" color regions. Because, boundary pixels are more likely to overlay or neighbor other objects, which may be of at least one different color, they may be identified initially as trapping candidates. Similarly, pixels within the interior of an object, i.e. non-boundary pixels can be considered as pixels in "constant color" regions because they are less likely to be adjacent to pixels of another color.

In some embodiments, the exemplary method shown in FIG. 4 may utilize information about likely non-constant color regions in objects of a given display list to optimize the search space for trapping regions. Constant color regions are not normally trapped; therefore, eliminating regions of constant color from the trapping search space can reduce the number of pixels checked for trapping. In some embodiments, a mechanism to identify non-constant (or constant) color regions may be used to indicate trapping regions a priori to trapping algorithms thereby permitting reductions to the search space for trapping candidates. In some embodiments, one or more flags may be associated with a pixel, and can be used to indicate pixel characteristics that increase or decrease the likelihood that pixel will be included as a candidate for trapping. For example, in one embodiments, flags may be used indicate whether a pixel is of non-constant or constant color.

In step 430 of the exemplary flowchart 400, a flag setting routine may be implemented in one embodiment at the time of rasterization, or, in another embodiment, just prior to the rasterization of data in frame buffer 350. In step 430, objects in display list 325 may be processed and a value may be set for the flags associated with pixels corresponding to the objects. In some embodiments, each flag may be associated with a unique pixel and each flag can be used to indicate information such as (but not limited to) source, class type (such as text, graphics, gradient, image, etc.), painted (or not painted), constant (or non-constant) color or other such information about that pixel.

In some embodiments, each flag can further include a plurality of bits where each bit can be used to include information associated with a pixel. For example, each flag can include two bits (b1b0) where b0 can indicate if a pixel has been painted (or not painted), and b1 can indicate whether a pixel is of non-constant color (or constant color). As each object is processed in step 430, pixels corresponding to that object may be flagged as painted and corresponding painted flag b0 can be set as true. Similarly, appropriate bits in flags associated with boundary pixels in the object may be set initially to indicate that they have non-constant color, which can be indicated by setting non-constant color flag b1 to true. Setting a bit in a flag assigns a logic '1' to the value of the bit, while resetting a bit in the flag assigns a logic '0' to the value of the bit. In general, a plurality of multi-bit flags may be associated with a given pixel to indicate various other conditions and object-related parameters. However, for ease of description, the embodiments are described with reference to a painted flag, which indicates whether a pixel in the frame buffer is associated with an object, and a non-constant flag, which can indicate whether a pixel is likely to be adjacent to at least one pixel of a different color. Setting the "painted" bit may indicate that the pixel associated with the flag has been painted. Similarly, setting the "non-constant" bit may indicate that the pixel associated with the flag is in, or adjacent to, a region of non-constant color. In some embodiments, each pixel in the frame buffer may have a distinct painted flag and a distinct non-constant flag associated with the pixel.

In some embodiments, as each object is processed in step 430, flags associated with the pixels corresponding to the object may be stored in an object flag buffer such as exemplary object flag buffer 455, which may be physically located in memory 172. In some embodiments, there may be a one to one correspondence between flags in flag buffer 455 and pixels in frame buffer 350. In some embodiments, flag buffer 455 may be implemented as one or more 2-dimensional arrays. In some embodiments, flag buffer 455 may be configured with the same geometry as frame buffer 350 so that locations in frame buffer 350 may be correlated directly with locations in flag buffer 455. In some embodiments, flag buffer 455 may be logically separate from frame buffer 350 and each pixel may be assigned a flag, written into an appropriate location in flag buffer 455.

As discussed earlier, display list 325 may include a plurality of objects. As each object in display list 325 is rasterized, in step 430, the painted flags (in flag buffer 455) associated with pixels corresponding to the object can be set as true. Moreover, non-constant color flags associated with pixels lying on an object boundary can be set as "1" or true (indicating non-constant color) and the non-constant color flags of pixels not associated with an object boundary (non-boundary pixels) can be assigned a logical "0" or false (indicating constant color).

An exemplary graphical illustration of flags associated with pixels in frame buffer 350 is shown in FIG. 4. As shown in FIG. 4, graphical object 460 is painted in frame buffer 350. Non-constant color flags associated with pixels lying on the boundary of object 460 are set to true, as shown by the dark bordered region 470, in flag buffer 455. As shown in FIG. 4, region 470 can form a one pixel border between pixels flagged as "constant color" associated with object 460, and any pixels associated with any other external display list objects that may be in close proximity to object 460. In addition, non-constant color flags associated with non-boundary pixels can be assigned a logical "0" or "false" value, as shown in lighter interior region 475, in flag buffer 455.

In some cases, when an object is placed into frame buffer 350, pixels associated with the object may be close proximity to, or may overlay portions of one or more objects already in frame buffer 350. In some embodiments, when an object that is currently being processed overlaps with another previously processed object in frame buffer 350, flags associated with pixels that are related to the two overlapping objects may be modified. The nature of flag modification may depend on the type of overlap that occurs.

For example, when a non-transparent or opaque object is overlaid over one or more prior objects in frame buffer 350, the operation is termed an opaque operation because pixels of the newly laid object will completely obscure any underlying overlapping pixels. In other words, all pixels common to the objects will take on pixel values of the current object when it is written into frame buffer 350. Similarly, when a transparent object is overlaid over one or more prior objects in frame buffer 350, the operation is termed a non-opaque operation. In non-opaque operations, the pixel values are blended so that the final value of any common pixels is some convolution of the pixel values. In some embodiments, display list 325 can include information that may indicate if an object is opaque or non-opaque.

In some embodiments, flag values associated with any overlapping pixels may also take on different values depending on whether an object placed in frame buffer 350 is opaque or non-opaque. In some embodiments, the flag setting routine in step 430 can utilize the opaque and/or non-opaque information pertaining to an object and modify the flags associated with the corresponding pixels appropriately. In some embodiments, during an opaque operation, flags associated with the pixels related to the overlapping objects can be overwritten with the corresponding flag values of the pixels associated with the new (overlaying) opaque object. In some embodiments, during a non-opaque operation, flag values associated with pixels related to the new (overlaying) object can be logically OR'ed with any corresponding prior flag values associated with those pixels in flag buffer 455.

In some embodiments, at the time of rendering objects from display list 325 into frame buffer 350, flags associated with pixels painted by the objects may be processed and their values may be set in flag buffer 455. For example, when rendering an object, if a pixel at coordinate (x,y) is painted in frame buffer 350, then a corresponding flag (x,y) in flag buffer 455 can be set to a flag value associated with the pixel. If the object is opaque, then flag (x,y) may take on the value of the flag associated with the object. If the object is non-opaque, then flag (x,y) may be obtained as: (New) flag(x,y)=(Existing) flag(x,y) OR (Object) flag(x,y), where OR is the logical "OR" operator.

In step 440, a flag analysis routine can be used to analyze flag buffer 455 and frame buffer 350 to identify pixels that are candidates for trapping. Pixels identified as candidates for trapping may be processed in step 360 using standard trapping algorithms. In some embodiments, flag analysis routine of step 440 may be included as part of the trapping algorithm in step 360.

Figure 5:
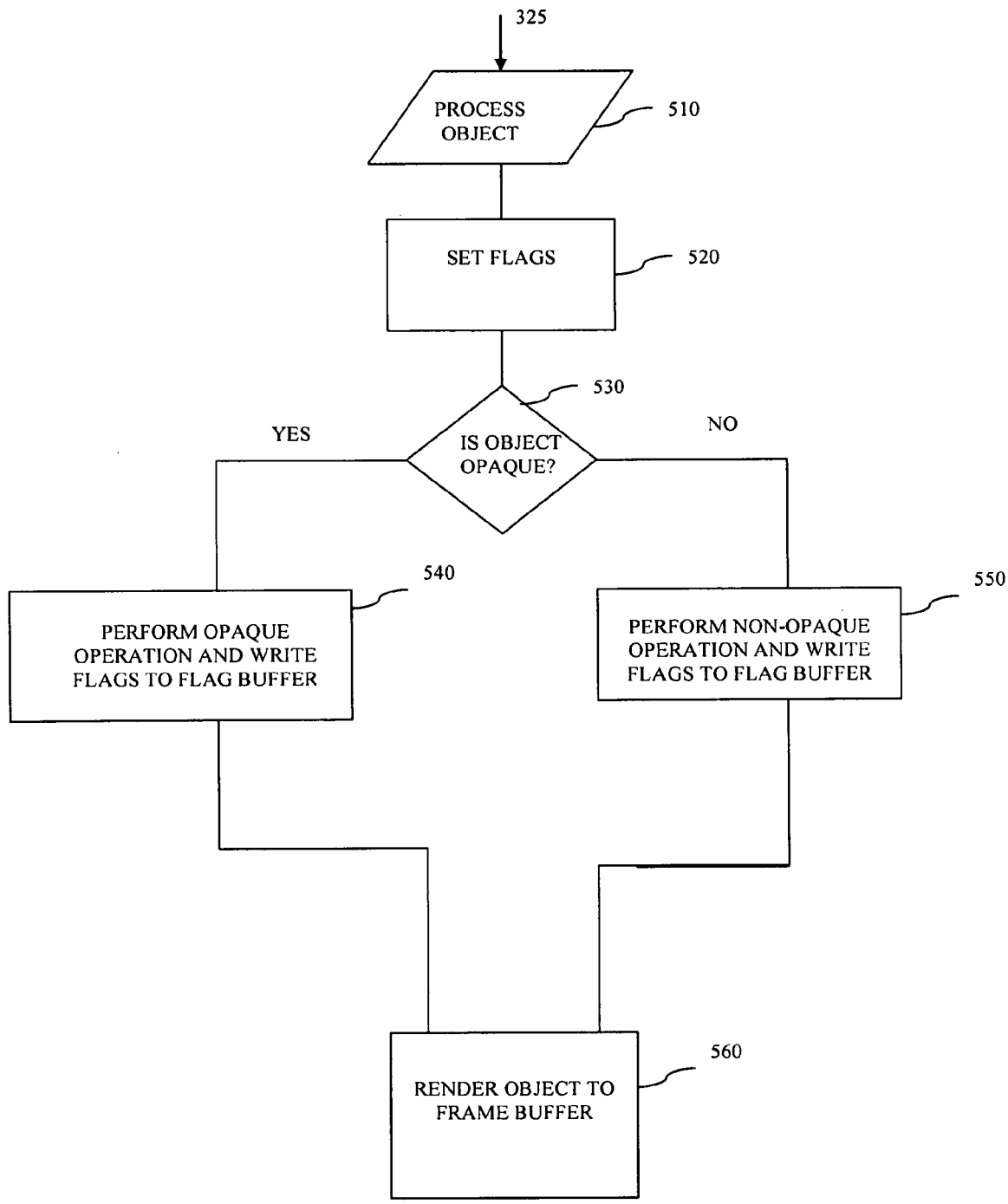
FIG. 5 shows a flowchart illustrating an exemplary method for setting flags associated with pixels in the frame buffer.

FIG. 5 shows a flowchart 500 illustrating an exemplary method for setting flags associated with pixels in frame buffer 350. In some embodiments, the method in flowchart 500 may be implemented as part of flag setting routine in step 430. The algorithm may commence in step 510 by processing an object from an object stream derived from display list 325.

In step 520, the values of flags (both painted and non-constant flags) associated with pixels corresponding to the object can be set. In some embodiments, in step 520, painted flags associated with pixels corresponding to the object can be set as true to indicate that the pixels have been painted. Further, non-constant flags for boundary pixels associated with the object can be set as true to indicate non-constant color. Next, non-constant flags associated with non-boundary pixels can be set as false (to indicate constant color).

In step 530, parameters associated with the object may be checked to determine if the object is opaque or not. If the object is opaque ("YES"), then, in step 540, an opaque operation (as discussed in FIG. 4 above) may be performed and the flags associated with pixels corresponding to the object may be written to flag buffer 455. If in step 530, the object is non-opaque ("NO"), then in step 550, a non-opaque operation (as discussed in FIG. 4 above) may be performed and the flags associated with pixels corresponding to the object may be written to flag buffer 455. In step 560, the object can be rendered to frame buffer 350.

Figure 6A:
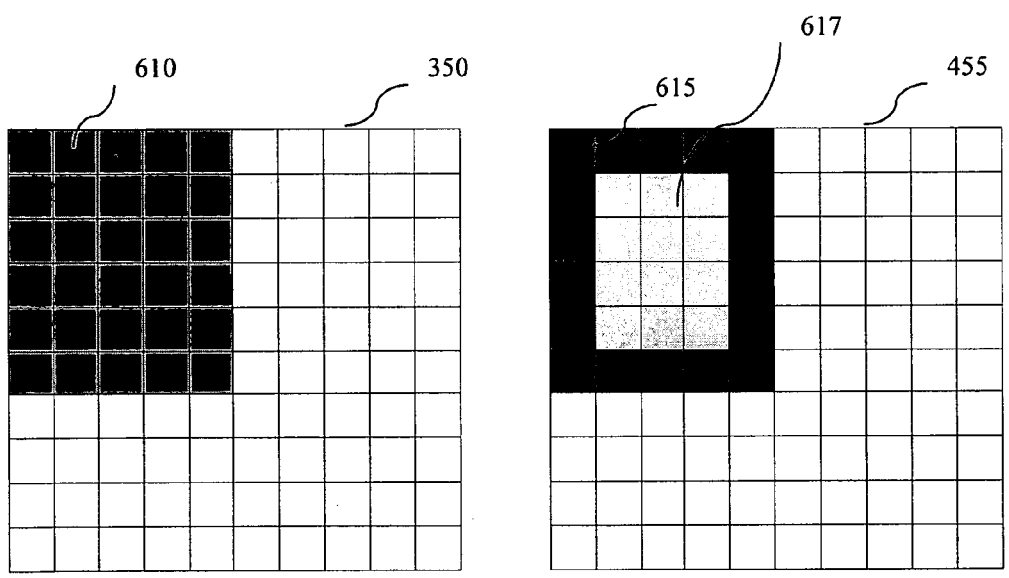
FIGS. 6a, 6b, and 6c illustrate changes to pixels and flags associated with pixels when opaque and non-opaque operations are performed on graphical objects.
Figure 6B:
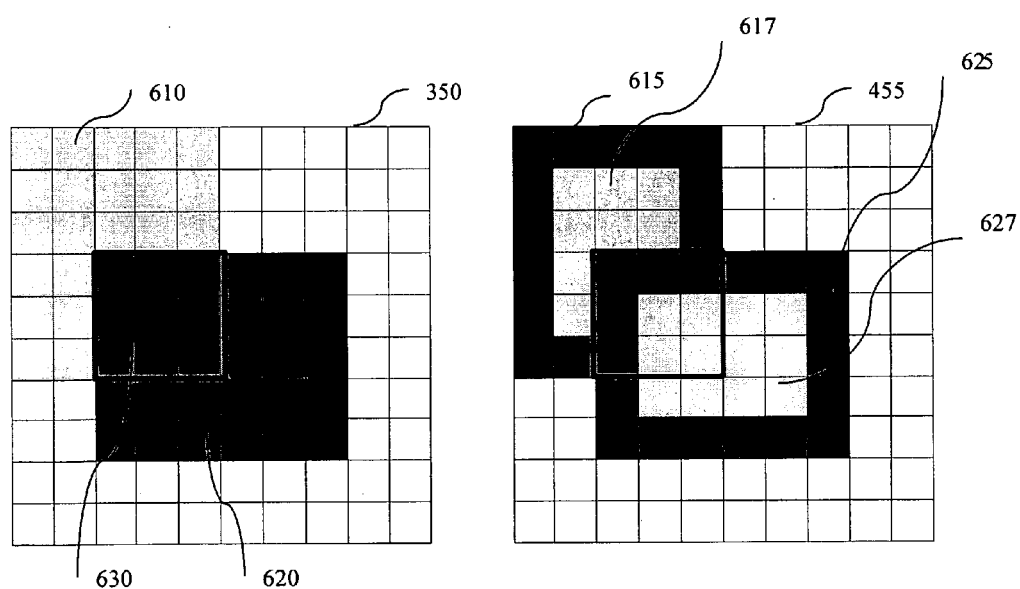
Figure 6C:
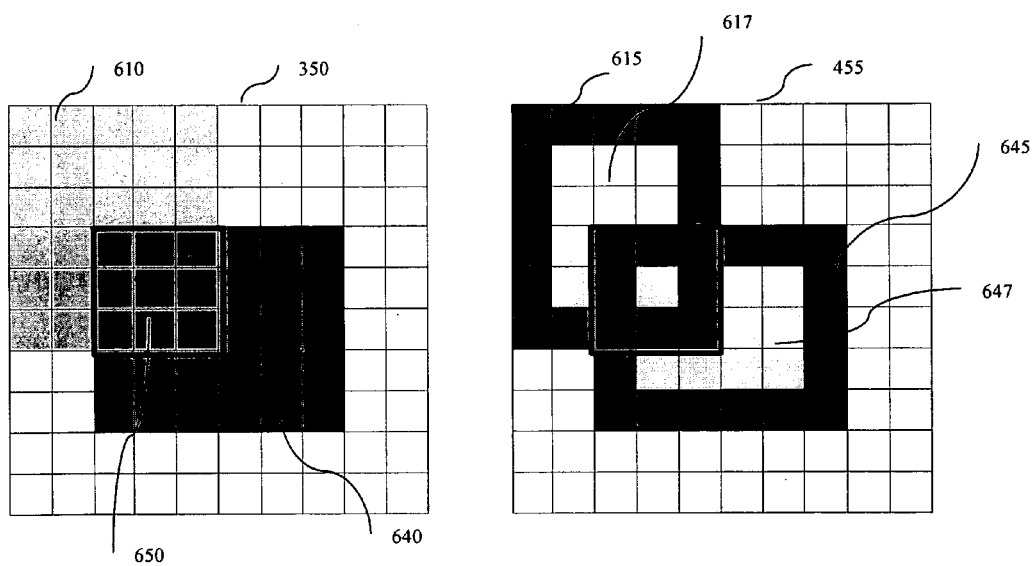

FIGS. 6a, 6b, and 6c are exemplary illustrations of changes to flags associated with pixels when opaque and non-opaque operations are performed on graphical objects. As shown in FIG. 6a, constant color object 610 is painted in an empty area of frame buffer 350. Non-constant color flags associated with pixels lying on the boundary of object 610 are set to true, as shown by the dark bordered region 615, in flag buffer 455. In addition, non-constant color flags associated with non-boundary pixels can assigned as "false", as shown by the lighter interior region 617 in flag buffer 455. As can be seen in FIG. 6a, region 615 can form a one pixel border between constant color pixels associated with object 610 and constant color pixels associated with any other display list object that may be in close proximity, or that may overlay portions of object 610.

FIG. 6b depicts pixels associated with new opaque constant color object 620, which have been placed on top of object 610, in frame buffer 350. The overlapping of objects 610 and 620 creates overlapping common area 630. As shown in FIG. 6b, non-constant color flags associated with pixels lying on the boundary of object 620 are set to true, as indicated by dark bordered region 625 in flag buffer 455. In addition, as shown in FIG. 6b, non-constant color flags associated with non-boundary pixels can be reset, as shown by the lighter interior region 627 in flag buffer 455. Note that some pixels in region 627, that were marked earlier as "non-constant" (i.e. non-constant flag was set), have now been reset as they correspond to pixels that fall within the interior of overlaying opaque object 620. As shown in FIG. 6b, regions 615 and 625 form a one pixel border between the constant color pixels associated with object 610 and the constant color pixels associated with object 620. Further, the flag values associated with pixels in region 630 may be obtained by using flag values associated with newly laid opaque object 620 thereby overwriting any prior values.

FIG. 6c depicts a non-opaque constant color object 640, which has been placed on top of object 610, in frame buffer 350 and associated flag values of in the flag buffer 455. As shown in FIG. 6c, flag values for pixels associated with a boundary on either object are set, as indicated by the dark bordered regions 615 and 645, in flag buffer 455. In addition, non-constant color flags associated with non-boundary pixels are assigned logical "0" values, as shown by lighter interior regions 617 and 647 in flag buffer 455. Flag values associated with pixels may be preserved during non-opaque operations by logically "OR"ing flag values associated with pixels in the newly laid object with existing flag values of corresponding pixels in the frame buffer.

Figure 7:
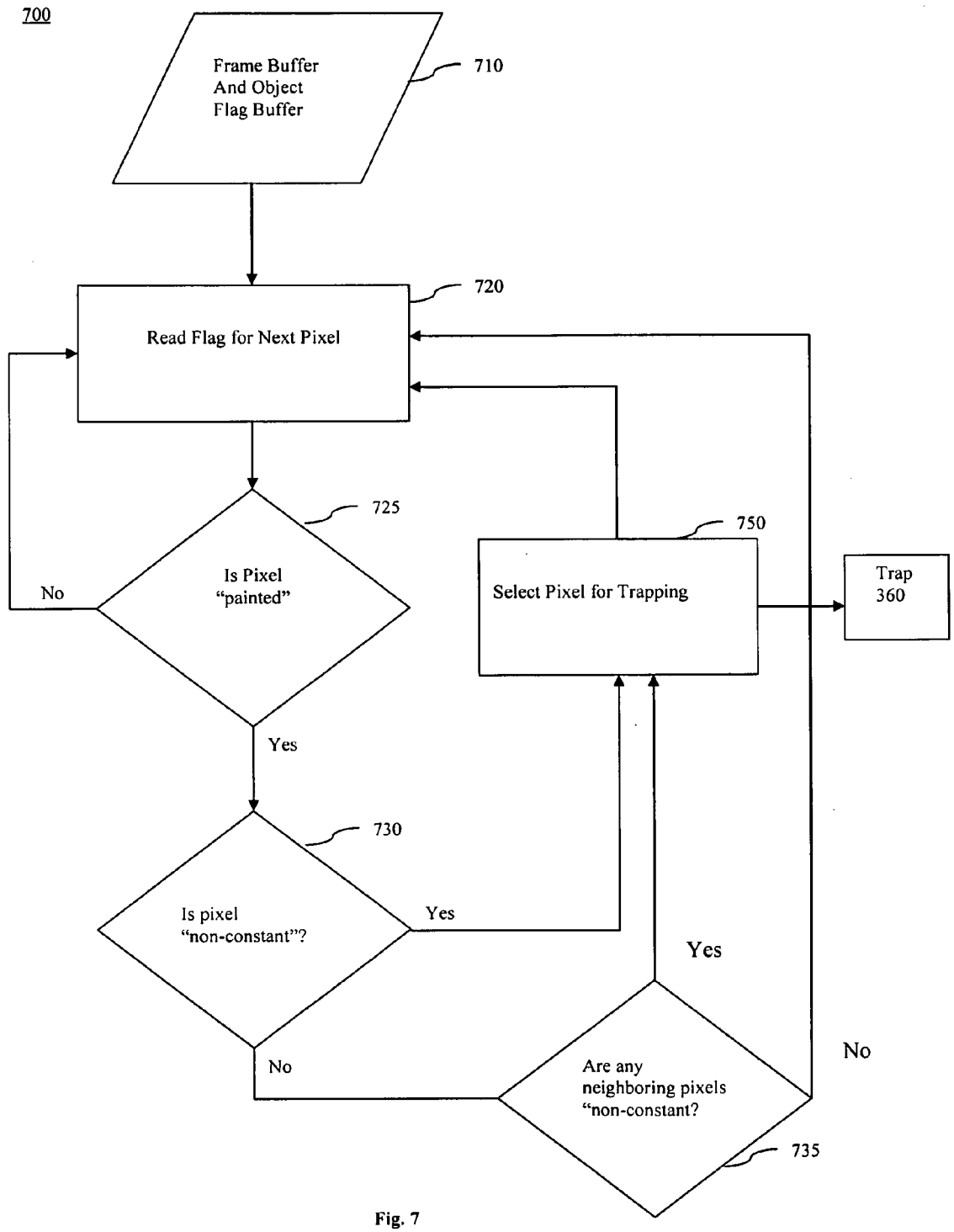
FIG. 7 shows a flowchart illustrating an exemplary method for analyzing flags associated with pixels.

FIG. 7 shows exemplary flowchart 700 illustrating steps involved in the flag analysis routine that may be implemented in step 440 consistent with some disclosed embodiments. The algorithm may commence in step 710 by accessing data in frame buffer 350 and flag buffer 455. In step 720, flags associated with a pixel in frame buffer 350 may be read. In step 725, the painted flag associated with the pixel may be checked. If the painted flag is false, then in step 720, flags associated with a new pixel may be read from flag buffer 455. When the painted flag associated with a pixel has not been set, then that pixel does not correspond to any objects in frame buffer 350 and may therefore be ignored for trapping purposes.

If in step 725, if the painted flag is true ("yes"), then in step 730, the non-constant flag of the pixel may be checked. If the non-constant flag of the pixel is true ("yes"), in step 750, the pixel can be selected as a candidate for trapping. If in step 730, if the non-constant flag is set as false ("no"), then in step 735, it is determined if any neighboring pixels are "non-constant". If yes, then the pixel is selected in step 750. If no, then flags associated with a new pixel are read from flag buffer 455 (step 720). In some embodiments, the pixels selected in step 750 may be sent to the trapping algorithm of step 360 and trapping can be calculated only for the selected pixels.

In some embodiments, a program for conducting the above process can be recorded on computer-readable media 150 or computer-readable memory. These include, but are not limited to, Read Only Memory (ROM), Programmable Read Only Memory (PROM), Flash Memory, Non-Volatile Random Access Memory (NVRAM), or digital memory cards such as secure digital (SD) memory cards, Compact Flash™, Smart Media™, Memory Stick™, and the like. In some embodiments, one or more types of computer-readable media may be coupled to printer 170. In certain embodiments, portions of a program to implement the systems, methods, and structures disclosed may be delivered over network 140.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A method for identifying and trapping a frame buffer pixel, the frame buffer pixel associated with at least two display list objects, the method comprising:
    setting a first bit in a multi-bit flag associated with the frame buffer pixel when rendering the frame buffer pixel to a frame buffer;
    determining a value for a second bit in the multi-bit flag associated with the frame buffer pixel by:
        setting the second bit in the multi-bit flag, if the frame buffer pixel of a first associated display list object is a non-constant color pixel,
        resetting the second bit in the multi-bit flag, if the frame buffer pixel of the first associated display list object is a constant color pixel and if the first display list object is opaque,
        setting the second bit in the multi-bit flag, if the frame buffer pixel of a second associated display list object is a non-constant color pixel, or if the second associated display list object is non-opaque,
        resetting the second bit in the second multi-bit flag, if the frame buffer pixel of the second associated display list object is a constant color pixel, and if the second associated display list object is opaque, and
    identifying the frame buffer pixel as a candidate for trapping
        if the second bit in the multi-bit flag associated with the frame buffer pixel has been set or
        if the second bit in the multi-bit flag associated with at least one pixel neighboring the frame buffer pixel has been set; and
    trapping the identified frame buffer pixel, wherein the trapping is performed on one or more of a computer and a printing device.

2. The method of claim 1, wherein the multi-bit flag is stored in a flag buffer.

3. The method of claim 1, wherein the frame buffer pixel is identified as a candidate for trapping if both the first and second bits in the multi-bit flag have been set.

4. The method of claim 1, wherein the second bit of the multi-bit flag indicates if the frame buffer pixel is a non-constant color pixel.

5. The method of claim 2, wherein the flag buffer is implemented as at least one two-dimensional array.

6. The method of claim 2, wherein the flag buffer is configured with a same geometry as the frame buffer.

7. The method of claim 2, wherein the flag buffer is logically separate from the frame buffer.

8. The method of claim 2, where in the multi-bit flag in the flag buffer has a one to one correspondence with the frame buffer pixel in the frame buffer.

9. The method of claim 1, wherein the method is performed during rasterization of the at least one display list object.

10. The method of claim 1, wherein the method is performed in conjunction with the rendering of the at least two display list objects into a frame buffer.

11. The method of claim 1, wherein the second bit of the multi-bit flag indicates if the frame buffer pixel is a non-boundary color pixel.

12. A non-transitory computer-readable medium that stores instructions, which when executed by a processor perform steps in a method for identifying and trapping a frame buffer pixel, the frame buffer pixel associated with at least two display list objects, the method comprising:
   setting a first bit in a multi-bit flag associated with the frame buffer pixel when rendering the frame buffer pixel to a frame buffer;
   determining a value for a second bit in the multi-bit flag associated with the frame buffer pixel by:
      setting the second bit in the multi-bit flag, if the frame buffer pixel of a first associated display list object is a non-constant color pixel,
      resetting the second bit in the multi-bit flag, if the frame buffer pixel of the first associated display list object is a constant color pixel and if the first display list object is opaque,
      setting the second bit in the multi-bit flag, if the frame buffer pixel of a second associated display list object is a non-constant color pixel, or if the second associated display list object is non-opaque,
      resetting the second bit in the second multi-bit flag, if the frame buffer pixel of the second associated display list object is a constant color pixel, and if the second associated display list object is opaque, and
   identifying the frame buffer pixel as a candidate for trapping
      if the second bit in the multi-bit flag associated with the frame buffer pixel has been set or
      if the second bit in the multi-bit flag associated with at least one pixel neighboring the frame buffer pixel has been set; and
   trapping the identified frame buffer pixel.

13. The computer-readable medium of claim 12, wherein the multi-bit flag is stored in a flag buffer.

14. The computer-readable medium of claim 12, wherein the frame buffer pixel is identified as a candidate for trapping if both the first and second bits in the flag have been set.

15. The computer-readable medium of claim 12, wherein the method is performed during rasterization of the at least one display list object.

16. The computer-readable medium of claim 12, wherein the method is performed in conjunction with the rendering of the at least two display list objects into a frame buffer.

17. A computer readable memory containing instructions for controlling a processor to perform steps in a method for identifying and trapping a frame buffer pixel, the frame buffer pixel associated with at least two display list objects, the method comprising:
   setting a first bit in a multi-bit flag associated with the frame buffer pixel when rendering the frame buffer pixel to a frame buffer;
   determining a value for a second bit in the multi-bit flag associated with the frame buffer pixel by:
      setting the second bit in the multi-bit flag, if the frame buffer pixel of a first associated display list object is a non-constant color pixel,
      resetting the second bit in the multi-bit flag, if the frame buffer pixel of the first associated display list object is a constant color pixel and if the first display list object is opaque,
      setting the second bit in the multi-bit flag, if the frame buffer pixel of a second associated display list object is a non-constant color pixel, or if the second associated display list object is non-opaque,
      resetting the second bit in the second multi-bit flag, if the frame buffer pixel of the second associated display list object is a constant color pixel, and if the second associated display list object is opaque, and
   identifying the frame buffer pixel as a candidate for trapping
      if the second bit in the multi-bit flag associated with the frame buffer pixel has been set or
      if the second bit in the multi-bit flag associated with at least one pixel neighboring the frame buffer pixel has been set; and
   trapping the identified frame buffer pixel.

18. The computer-readable memory of claim 17, wherein the multi-bit flag is stored in a flag buffer.

19. The computer-readable memory of claim 17, wherein the second bit of the multi-bit flag indicates if the frame buffer pixel is a non-boundary color pixel.

20. The computer-readable memory of claim 17, wherein the frame buffer pixel is identified as a candidate for trapping if both the first and second bits in the flag have been set.

* * * * *